US009634523B2

(12) United States Patent
Vollenwyder (10) Patent No.: US 9,634,523 B2
(45) Date of Patent: Apr. 25, 2017

(54) SYSTEM AND METHOD FOR TRANSFERRING ELECTRIC ENERGY TO A VEHICLE USING A PLURALITY OF SEGMENTS OF A CONDUCTOR ARRANGEMENT (75) Inventor: Kurt Vollenwyder, Kingston (CA)

(73) Assignee: Bombardier Transportation GmbH, Berlin (DE)

(*) Notice: Subject to any disclaimer, the term of this patent is extended or adjusted under 35 U.S.C. 154(b) by 619 days.

(21) Appl. No.: 14/124,284

(22) PCT Filed: Jun. 11, 2012

(86) PCT No.: PCT/EP2012/061024
§ 371 (c)(1),
(2), (4) Date: Dec. 6, 2013

(87) PCT Pub. No.: WO2012/168475
PCT Pub. Date: Dec. 13, 2012

(65) Prior Publication Data
US 2014/0097674 A1 Apr. 10, 2014

(30) Foreign Application Priority Data
Jun. 10, 2011 (GB) .................................. 1109826.6

(51) Int. Cl.
B60L 1/00 (2006.01)
H02J 17/00 (2006.01)
(Continued)

(52) U.S. Cl.
CPC .............. *H02J 17/00* (2013.01); *B60L 5/005* (2013.01); *B60M 3/04* (2013.01); *B60L 2200/26* (2013.01)

(58) Field of Classification Search
CPC ...... B60L 5/005; B60L 2200/26; H02J 17/00; B60M 3/04
(Continued)

(56) References Cited

U.S. PATENT DOCUMENTS 4,836,344 A 6/1989 Bolger
5,207,304 A 5/1993 Lechner et al.
(Continued)

FOREIGN PATENT DOCUMENTS

CA 2403762 A1 9/2002
CN 1456458 A 11/2003
(Continued)

OTHER PUBLICATIONS

Covic, G., et al. A Three-Phase Inductive Power Transfer System for Roadway-Powered Vehicles, IEE Transactions on Industrial Electronics, vol. 54, No. 6, pp. 3370-3378 (2007).

Primary Examiner — Jared Fureman
Assistant Examiner — Duc M Pham
(74) Attorney, Agent, or Firm — The Webb Law Firm (57) ABSTRACT A system for transferring electric energy to a vehicle. The system comprises an electric conductor arrangement which produces an alternating electromagnetic field, transfers electromagnetic energy to the vehicle, and includes a plurality of consecutive segments. Each segment extends along the path of travel of the vehicle. The system includes an alternating current supply for conducting electric energy to the segments which are electrically connected in parallel to each other with the alternating current supply. Each segment is coupled to the supply via an associated switching unit adapted to switch on and off the segment by connecting or disconnecting the segment to/from the supply. Each segment is coupled to the associated switching unit via a constant current source adapted to keep the electric current through
(Continued)

the segment constant while the segment is switched on independently of the electric power which is transferred to one or more vehicles.

12 Claims, 5 Drawing Sheets

(51) Int. Cl.
*B60L 5/00* (2006.01)
*B60M 3/04* (2006.01)

(58) Field of Classification Search
USPC .......................................................... 307/9.1
See application file for complete search history.

(56) References Cited

U.S. PATENT DOCUMENTS

| | | | |
|---|---|---|---|
| 5,821,728 A * | 10/1998 | Schwind | B60L 11/182 320/108 |
| 6,005,304 A | 12/1999 | Seelig | |
| 6,089,362 A | 7/2000 | Takasan et al. | |
| 2003/0200025 A1 | 10/2003 | Ross | |
| 2003/0227269 A1 | 12/2003 | Fischperer | |
| 2011/0198176 A1 * | 8/2011 | Meins | B60L 5/005 191/10 |
| 2012/0217112 A1 * | 8/2012 | Zengerle | B60L 5/005 191/22 R |
| 2013/0057204 A1 * | 3/2013 | Vollenwyder | B60L 5/005 320/108 |

FOREIGN PATENT DOCUMENTS

| | | |
|---|---|---|
| DE | 4446779 A1 | 6/1996 |
| DE | 19856937 A1 | 6/2000 |
| EP | 0289868 A2 | 11/1988 |
| GB | 2461578 A | 7/2008 |
| GB | 2463692 A | 9/2008 |
| GB | 2474867 A | 10/2009 |
| GB | 2476497 A | 12/2009 |
| JP | 11355913 A | 12/1999 |
| WO | 9323908 A1 | 11/1993 |
| WO | 9323909 A1 | 11/1993 |
| WO | 9908359 A1 | 2/1999 |
| WO | 9930402 A1 | 6/1999 |
| WO | 0171882 A1 | 9/2001 |
| WO | 2010000495 A1 | 1/2010 |
| WO | 2010031593 A2 | 3/2010 |
| WO | 2010031595 A2 | 3/2010 |
| WO | 2010117139 A2 | 10/2010 |
| WO | 2011046400 A2 | 4/2011 |
| WO | 2011145953 A1 | 11/2011 |

* cited by examiner

SYSTEM AND METHOD FOR TRANSFERRING ELECTRIC ENERGY TO A VEHICLE USING A PLURALITY OF SEGMENTS OF A CONDUCTOR ARRANGEMENT

CROSS-REFERENCE TO RELATED APPLICATIONS

This application is the United States national phase of International Application No. PCT/EP2012/061024 filed Jun. 11, 2012, and claims priority to United Kingdom Patent Application No. 1109826.6 filed Jun. 10, 2011, the disclosures of which are hereby incorporated in their entirety by reference.

BACKGROUND OF THE INVENTION

Field of the Invention

The invention relates to a system for transferring electric energy to a vehicle, in particular to a track bound vehicle such as a light rail vehicle (e.g. a tram) or to a road automobile such as a bus. The system comprises an electric conductor arrangement for producing an alternating electromagnetic field and for thereby transferring electromagnetic energy to the vehicle. The conductor arrangement comprises a plurality of consecutive segments, wherein each segment extends along a different section of the path of travel of the vehicle.

Description of Related Art

Track bound vehicles, such as conventional rail vehicles, mono-rail vehicles, trolley busses and vehicles which are guided on a track by other means, such as other mechanical means, magnetic means, electronic means and/or optical means, require electric energy for propulsion on the track and for operating auxiliary systems, which do not produce traction of the vehicle. Such auxiliary systems are, for example, lighting systems, heating and/or air condition system, the air ventilation and passenger information systems. However, more particularly speaking, the present invention is related to a system for transferring electric energy to a vehicle which is not necessarily (but preferably) a track bound vehicle. A vehicle other than a track bound vehicle is a bus, for example. An application area of the invention is the transfer of energy to vehicles for public transport. Generally speaking, the vehicle may be, for example, a vehicle having an electrically operated propulsion motor. The vehicle may also be a vehicle having a hybrid propulsion system, e.g. a system which can be operated by electric energy or by other energy, such as electrochemically stored energy or fuel (e.g. natural gas, gasoline or petrol).

WO 2010/000495 A1 describes a system for transferring electric energy to a vehicle, wherein the system comprises an electric conductor arrangement for producing an alternating electromagnetic field and for thereby transferring the energy to the vehicle. The electric conductor arrangement comprises at least two lines, wherein each line is adapted to carry a different one of phases of an alternating electric current. The conductor arrangement comprises a plurality of segments, wherein each segment extends along a different section of the path of travel of the vehicle. Each segment comprises sections of the at least two lines and each segment can be switched on and off separately of the other segments. Each one of successive segments of the conductor arrangement can be connected via a separate switch for switching on and off the element to a mainline. WO 2010/000495 A1 describes the field of invention and possible embodiments of the conductor arrangement in more detail. In particular, the serpentine-like embodiment of the conductor arrangement can also be chosen for the present invention.

In order to improve the EMC (Electromagnetic Compatibility) the segments of the conductor arrangement may be fed by a direct current line. Each segment may comprise an inverter for converting the direct current to an alternating current for producing the electromagnetic field. However, each inverter requires cooling during operation. The effort for manufacturing, installing and cooling a number of inverters which is equal to the number of segments is high. Furthermore, with respect to inverters having solid state switches, such as IGBTs (Insulated Gate Bipolar Transistors), the input voltage on the input side of the inverter is limited to the respective maximum operation voltage of the solid state switches. Instead of a direct current supply line, an alternating current supply line may be used to feed the segments. However, it may also be required to convert the current through the supply line in this case. For example, voltage level and frequency in the supply line may differ from the voltage level and frequency which is required for operating the individual segments. Therefore, converters for converting the voltage level and/or frequency may be used instead of the inverters.

Producing a constant alternating current in the line or lines of the segments has several advantages compared to the operation of the segment at constant voltage. One advantage is that the constant current may be a sinus function of time. This means that only a single frequency of electromagnetic waves is produced. Operating the segment at constant voltage in contrast produces non-sinusoidal functions, which means that harmonics at different frequencies are produced, unless a corresponding filter is provided.

Furthermore a constant current on the primary side (the side of the conductor arrangement along the track) enables to reduce the size of the receiver for receiving the electromagnetic field on the secondary side (the side of the vehicle).

SUMMARY OF THE INVENTION

It is an object of the present invention to provide a system for transferring electromagnetic energy from a track to a vehicle or to a plurality of vehicles, which reduces the effort for cooling and the effort for operating the different segments of the conductor arrangement. Furthermore, the number of active electric and/or electronic components shall be reduced. Preferably, detection of vehicles and corresponding selective operation of segments shall be facilitated and/or it shall be possible to operate segments at an effective voltage being higher than the maximum input voltage of solid state switches which are part of an inverter for inverting a direct current into an alternating current for supplying the segment with electric energy.

The system of the present invention comprises an alternating current supply for conducting electric energy to a plurality of the segments. The segments are electrically connected in parallel to each other with the alternating current supply, i.e. each of the segments which is fed by the alternating current supply is operated using the same voltage. A common alternating current supply for a plurality of segments does not exclude the existence of further segments which are connected to a separate, second alternating current supply. Furthermore, not all segments which are fed by the alternating current supply must be segments for providing vehicles on the same track with energy. Rather, a railway or a road may comprise, for example, two tracks extending in parallel to each other and each of the tracks may be provided with consecutive segments. At least some of the segments of different tracks may be fed by a common alternating current supply.

Each of the plurality of segments is coupled to the alternating current supply via an associated switching unit adapted to switch on and off the segment by connecting or disconnecting the segment to/from the supply. Each switching unit may comprise a number of switches which corresponds to the number of lines of the associated segment, wherein the lines are adapted to carry a different phase of an alternating current. Preferably, the switches of the switching unit are synchronously switched on and off, for example by using a common control device for controlling the operation of the switches.

More generally speaking, the switching unit enables automatically switching on and off the associated segment. This means that the segment can be switched on if a vehicle is travelling along the segment or shortly before the vehicles is reaching the region of the segment. Since the segment and the other segments which are fed by the same alternating current supply are connected to an alternating current supply, there is no inverter (more generally speaking: no converter for converting the current through the current supply) required at the interface between the alternating current supply and the respective segment. Although a control device for controlling the operation of the switching unit is preferably located at the switching unit, the construction and operation of the control device is facilitated compared to the construction and operation of a control device for controlling the operation of an inverter. Typically, an inverter control device comprises individual low-level control units (so-called GDU, Gate Drive Units, for example) for each individual switch (IGBT, for example) and a higher-lever control unit for controlling and coordinating the operation of the low-level control units. The switching unit at the interface between the segment and the alternating current supply may also comprise the low-level individual control units for each switch of the switching unit, but the construction and operation of any higher-level control unit (if required at all) is facilitated. Switching off and on the switching unit is only required if the operation of the segment is started or stopped. The length of the time interval during which the segment is operated may, for example, be in the range of some seconds. In contrast, switching the frequency of an inverter or converter may be in the range of some kHz.

It has been mentioned that the respective segment is coupled to the alternating current supply via the associated switching unit. The term "coupled" includes a direct electric connection and alternatively includes inductive coupling, for example using a transformer. The same applies to the coupling described in the following.

During operation of the segment while the switching unit is switched on, each segment is coupled to the supply via the associated switching unit and via a constant current source adapted to keep the electric current through the segment constant, independently of the electric power which is transferred to one or more vehicles travelling along the segment. According to one embodiment, the segment is coupled to the associated switching unit via the constant current source. In this case, the switching unit and the constant current source are connected in series to each other. According to another embodiment, at least a part (e.g. an inductance) of the constant current source is arranged at the supply-side of the switching unit.

A basic idea of the present invention is the combination of the switching unit mentioned above with a constant current source at the interface between the respective segment and the alternating current supply. Since the segment is electrically separated from the supply while the associated switching unit is switched off, the constant current source does not produce heat while the segment is switched off. Furthermore, since the length of the time interval during which the segment is operated is typically much smaller than the off-time (at least if the length of the segment in travel direction is in the order of magnitude of the length of the vehicle), passive cooling of the constant current source is typically sufficient. Heat produced during operation can be dissipated to the ambiance during off-time.

On the other hand, cooling of any inverter or inverters (more generally speaking: at least one converter) at a central location for producing the alternating current, which is fed into the alternating current supply, can be performed in an effective manner, for example using closed circuit liquid cooling. The total (with respect to the whole system) effort for cooling is reduced, since several segments can be provided with energy originating from a central inverter or a central or distributed arrangement of a few inverters.

At least one inverter can be located at the feeding point, where electric energy is fed into the alternating current supply. The inverter or inverters produce the desired alternating voltage at the feeding point. In particular, voltage level and voltage frequency are predetermined and the at least one inverter is operated accordingly. However, the desired alternating voltage at the feeding point can be generated in a different manner. For example, a generator can be used which produces the desired alternating voltage and which is driven, for example, by an internal combustion motor. According to a further alternative, at least one converter may be arranged at the feeding point which converts the voltage level (i.e. the amplitude) and/or voltage frequency of an alternating voltage at an input side of the converter to the desired alternating voltage at the output side (i.e. at the feeding point). Therefore, at least one inverter, at least one generator and/or at least one converter may be used to feed the alternating current supply.

In addition, as will be described below, detection and corresponding control of the operation of the respective segment can be integrated in a common module comprising the switching unit and the constant current source. Therefore, the disadvantage of constant current operation mentioned above can be overcome.

A further advantage of the invention is the reduced number of active components, in particular the number of controlled switches, compared to solutions comprising one inverter per segment or one inverter for segments which cannot be operated at the same time. In contrast, the solution of the present invention allows individual operation of each segment independently of the other segments.

In particular, a system is proposed for transferring electric energy to a vehicle, in particular to a track bound vehicle such as a light rail vehicle or to a road automobile such as a bus, wherein the system comprises an electric conductor arrangement for producing an alternating electromagnetic field and for thereby transferring electromagnetic energy to the vehicle, the conductor arrangement comprises a plurality of consecutive segments, wherein each segment extends along a different section of the path of travel of the vehicle, the system comprises an alternating current supply for conducting electric energy to a plurality of the segments, wherein the segments are electrically connected in parallel to each other with the alternating current supply, each segment is coupled to the supply via an associated switching unit adapted to switch on and off the segment by connecting or disconnecting the segment to/from the supply, during operation of the segment while the switching unit is switched on, each segment is coupled to the supply via the associated switching unit and via a constant current source adapted to keep the electric current through the segment constant, independently of the electric power which is transferred to one or more vehicles travelling along the segment.

Furthermore, a method is proposed of manufacturing a system for transferring electric energy to a vehicle, in particular the system of one of the preceding claims, including the steps:

providing an electric conductor arrangement for producing an alternating electromagnetic field and for thereby transferring electromagnetic energy to the vehicle, providing a plurality of consecutive segments as part of the conductor arrangement, so that each segment extends along a different section of the path of travel of the vehicle, providing an alternating current supply for conducting electric energy to a plurality of the segments, wherein the segments are electrically connected in parallel to each other with the alternating current supply, coupling each segment to the supply via an associated switching unit, wherein the switching unit is adapted to switch on and off the segment by connecting or disconnecting the segment to/from the supply, coupling each segment to the supply via a constant current source, wherein the constant current source is adapted to keep the electric current through the segment constant—while the segment is switched on—independently of the electric power which is transferred to one or more vehicles travelling along the segment.

In addition, a method is proposed of operating a system for transferring electric energy to a vehicle, in particular the system of one of the preceding claims, including the steps:

producing an alternating electromagnetic field and thereby transferring electromagnetic energy to the vehicle by using an electric conductor arrangement, using a plurality of consecutive segments as part of the conductor arrangement, wherein each segment extends along a different section of the path of travel of the vehicle, conducting electric energy to a plurality of the segments by using an alternating current supply, wherein the segments are electrically connected in parallel to each other with the alternating current supply, using for each segment an associated switching unit in order to switch on and off the segment by connecting or disconnecting the segment to/from the supply, keeping the electric current through the segment constant—while the segment is switched on—independently of the electric power which is transferred to one or more vehicles travelling along the segment, wherein a constant current source, which is coupled to the segment on one side and to the supply on the other side is used to keep the current constant.

In particular, each segment can be switched on and off separately of the other segments which are coupled to the same alternating current supply.

The alternating current supply and the segments may comprise a plurality of lines, wherein each line is adapted to carry a different phase of a multi-phase alternating current, wherein each line of the plurality of the segments is coupled to a corresponding line of the alternating current supply via a corresponding switch of the associated switching unit.

Preferably, the switching unit of at least one of the segments is connected with a control device adapted to automatically control the switching state of the switching unit and thereby to control the operation of the segment.

The control device may be connected with a signal receptor, wherein the signal receptor is adapted to receive a signal indicating that a vehicle is located in the section of the path of travel along the segment or is about to reach the section and the signal receptor and the signal receptor is adapted to trigger the control device and the switching unit correspondingly so that the vehicle is provided with energy by the segment.

According to an embodiment, a vehicle travelling along the track may comprise a signal transmitter which repeatedly or continuously emits an enable signal to the track. The enable signal is received by the signal receptor associated to the respective segment while the receiver of the vehicle is travelling above the segment. The enable signal received enables the operation of the segment (i.e. the switching unit of the segment is in the on-state). If the enable signal is not received or is not received any more within an expected period of time, the segment is not operated, i.e. the switching unit is in the off-state.

Stopping the operation of the segment if there is no longer an enable signal from the vehicle overcomes another disadvantage of constant current operation: The receiver of the vehicle may be overheated if there is a malfunction or if the load is too small. Then, the vehicle can stop transmitting the enable signal. As a result, the operation of the segment is stopped and overheating is prevented/stopped. The transmission of the enable signal may be realized by inductive coupling or by other procedures.

Another application of the control device is to monitor the current through the segment for plausibility and/or in order to detect any malfunction. The control device may be connected with a current sensor for measuring the current through the segment or through one of the lines of the segment and wherein the control device is adapted to switch off the segment if the measured current fulfils a predetermined condition. The control device may be adapted to compare the size of the measured current with the expected size corresponding to the configuration of the constant current source. If the measured and expected values differ by at least a predetermined value, the control device switches off the segment, for example. This embodiment increases reliability of the constant current operation. Optionally, a corresponding failure signal can be transferred to a central system control or monitoring device.

Preferably, the electric conductor arrangement comprises three lines, each line carrying a different phase of a three-phase alternating current. However, it is also possible, that there are only two or more than three-phases carried by a corresponding number of lines. In particular, each of the segments may comprise sections of each of the lines, so that each segment produces an electromagnetic field which is caused by the three phases.

At least one of the segments may comprise an associated constant current source and an associated switching unit which are integrated in a common module. In particular, the common module may comprise the constant current sources and switching units associated to two segments which are consecutive segments with respect to the path of travel and/or the common module may comprise the constant current sources and switching units associated to two segments which are segments of different paths of travel extending in parallel or transversely to each other. Integrating a plurality of constant current sources and switching units facilitates the mounting of the system on site. In particular, the switching units and constant current sources may be buried in the ground. Furthermore, not only the effort for placing the units is reduced, but also the effort for establishing the electric connections between the units and the constant current sources on one side and the alternating current supply on the other side.

The common module may also comprise auxiliary equipment, such as a cooling fan or a liquid cooling arrangement. Furthermore, as mentioned above, the control device and/or any current sensor can be integrated in the common module.

For example, the common module may comprise a housing and/or a rack, wherein the components and units are arranged within the interior of the housing and/or fixed to the rack.

In particular, the common module may comprise a first and a second connection for connecting different sections of the alternating current supply to the common module. This means that the common module itself comprises a further section of the alternating current supply. This further section electrically connects the first and second connections for connecting the external sections of the alternating current supply.

BRIEF DESCRIPTION OF THE DRAWINGS

Embodiments and examples of the invention will be described with reference to the attached figures. The figures show.

DESCRIPTION OF THE INVENTION

Figure 1:
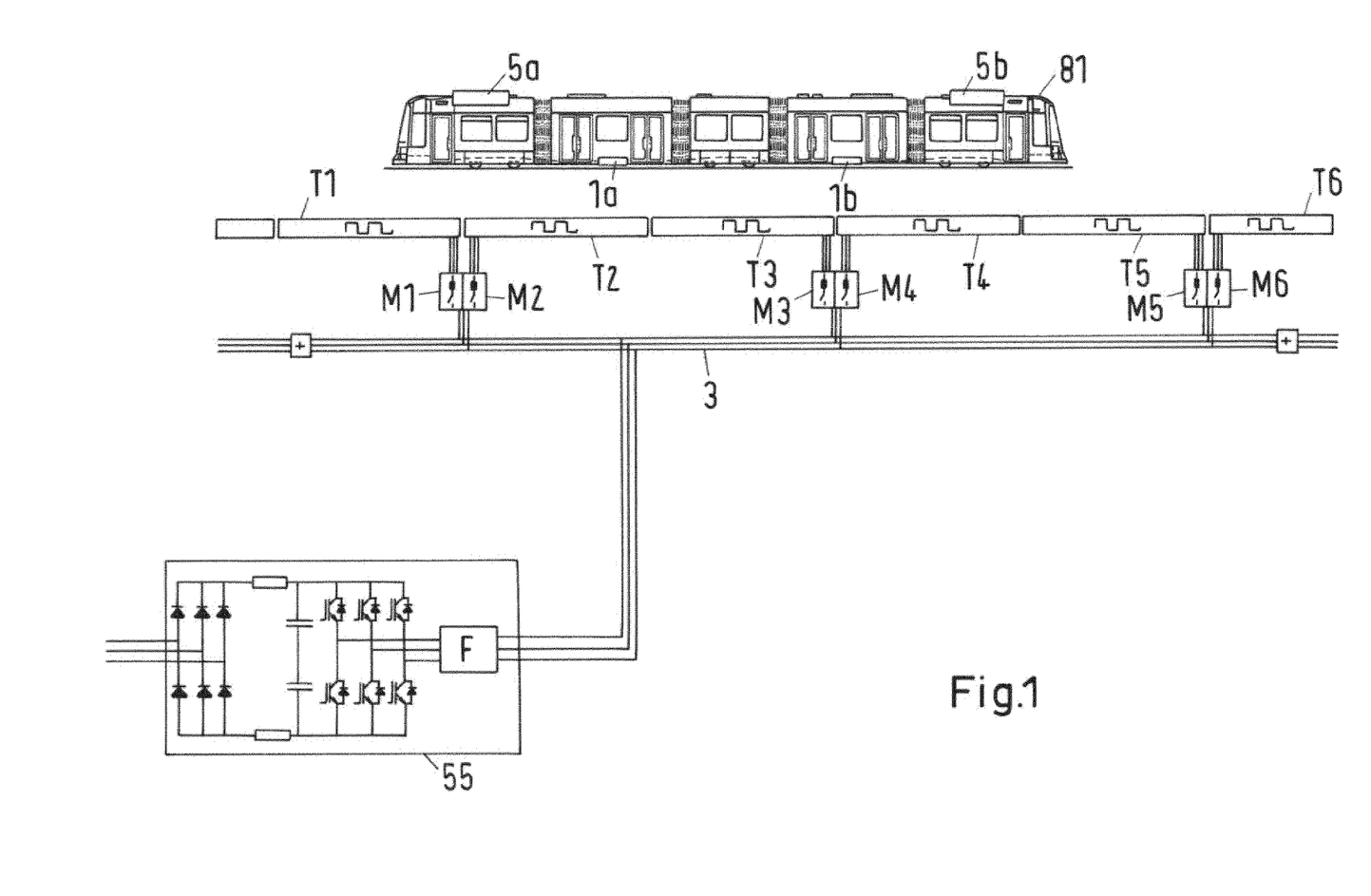
FIG. 1 an arrangement comprising a track for a rail vehicle and the vehicle, wherein the track is equipped with a plurality of segments for producing electromagnetic fields and wherein the segments are connected to an alternating current supply via modules comprising a switching unit and a constant current source, FIG. 2 an embodiment of a module comprising a switching unit and a constant current source, in particular one of the modules of FIG. 1, FIG. 3 a further embodiment of a module comprising a switching unit and a constant current source, wherein the module also comprises a control device for controlling the operation of switches and comprises a current sensor for measuring the current through at least one of the lines which are to be connected to the lines of the associated segment, FIG. 4 another embodiment of a module, additionally comprising capacitances for compensating inductances of the lines of the associated segment, FIG. 5 a further modification of the module comprising a transformer for transforming the alternating voltage on the side of the alternating current supply to an alternating voltage of the side of the segment, FIG. 6 schematically two tracks extending in parallel to each other, wherein each track comprises a plurality of segments and wherein switching units and constant current sources of in each case four segments are integrated in a common module, and FIG. 7 a track comprising segments of different lengths.

FIG. 1 schematically shows a vehicle 81, in particular a light rail vehicle such as a tram, travelling along a track. In this specific embodiment, the vehicle 81 comprises two receivers 1*a*, 1*b* for receiving electromagnetic fields which are produced by segments T1, . . . , T6 of the track. The receivers 1*a*, 1*b* are located at the bottom of the vehicle 81, in a middle section of the front part and back part of the vehicle 81. The receivers may comprise a plurality of lines for producing different phases of an alternating current. A vehicle may have any other number of receivers.

The receivers 1*a*, 1*b* are connected with other equipment within the vehicle 81, such as with a converter (not shown) for converting an alternating current produced by the receivers 1 to a direct current. For example, the direct current can be used to charge batteries or other energy storages 5*a*, 5*b* of the vehicle 81. Furthermore, the direct current can be inverted into an alternating current used to feed at least one traction motor of the vehicle 81 with electric energy.

The receivers 1*a*, 1*b* may be connected with a control device for controlling the operation of signal transmitters (not shown) which are also located at the bottom of the vehicle 81, so that signals emitted by the signal transmitters are emitted towards the track.

As mentioned, the track comprises a series of consecutive segments T1, T2, T3, T4, T5, T6 (in practice, further segments can be provided) which can be operated (i.e. energized) separately of each other and which produce during operation an electromagnetic field in order to transfer energy to the vehicle 81. Each segment extends across a section of the path of travel of the vehicle.

Optionally, there may be a loop of an electric line (not shown) also extending along the section of the corresponding segment T. Each loop may be, for example, a single or multiple winding of an electric conductor. Electromagnetic waves produced by a signal transmitter of the vehicle induce a corresponding electric voltage in the loop. Each loop may be connected, as will be described below, directly or indirectly to a control device for controlling the operation of switching units by switching on or off an associated segment T. The switching units and optionally the control devices are integrated in modules M1, M2, M3, M4, M5, M6 shown in FIG. 1. The modules M1, M2, M3, M4, M5, M6 are connected to a three-phase supply line 3 for conducting a three-phase alternating current which is generated by an inverter or AC/AC converter 55.

In the situation shown in FIG. 1, the receivers 1*a*, 1*b* of the vehicle 81 are located above segments T2, T4, respectively. Therefore, these segments T2, T4 are operated (i.e. are in the on-state, a current is flowing through the segment which causes the electromagnetic field) and the other segments T1, T3, T5, T6 are not operated (i.e. are in the off-state, there is no current through the segment).

Figure 2:
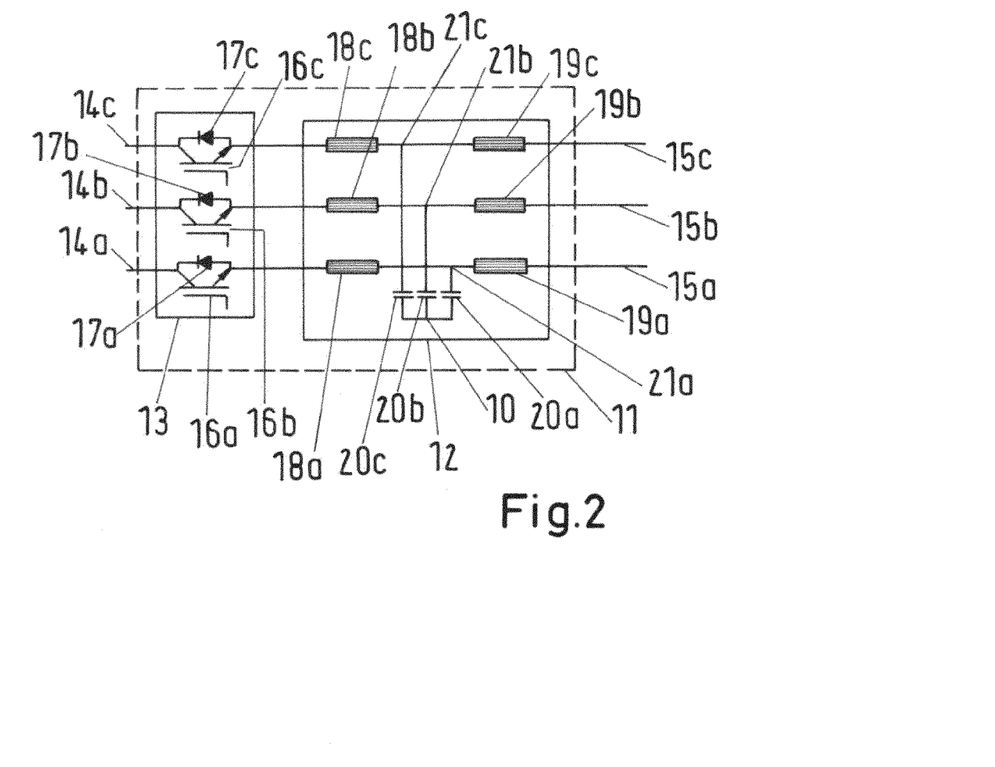

FIG. 2 shows a module 11 comprising a constant current source 12 and a switching unit 13. There are lines for three phases of a three-phase alternating current. Each line has a first contact 14*a*, 14*b*, 14*c* for connecting the line with the alternating current supply (for example the alternating current supply 3 of FIG. 1). Furthermore, each line has a second contact 15*a*, 15*b*, 15*c* for connecting the line with the three alternating current lines of the associated segment, for example segment T1 or T2 of FIG. 1. In case of segment T1 of FIG. 1, module 11 of FIG. 2 is module M1 of FIG. 1.

Following the current path of any of the three lines of module 11, the following components are arranged between the first contact 14 and the second contact 15. Within the switching unit 13, a solid state switch, in particular an IGBT 16, and a free-wheeling diode 17 are connected in parallel to each other. A corresponding control device for controlling the operation of the switches 16 is not shown in FIG. 2. Following the current path from the switching unit 13 towards the second contact 15, the line is connected to and comprises an inductance 18, followed by a junction 21 and a second inductance 19. The junctions 21 of each line are connected to a common star point 11 via a capacitance 20. Alternatively, the switches of the switching unit can be arranged in between the respective first inductance 18 and the respective junction 21.

In particular, the first inductances 18 and the capacitances 20 form a constant current source, i.e. while operated the associated segment is provided with a constant alternating current which is independent of the load. The second inductance 19 is optional, but preferred, in order to avoid the generation of reactive power during operation of the segment. In particular, the first and second inductances are dimensioned to be equal.

More generally speaking, the constant current source 12 shown in FIG. 2 is a passive network, which means that none of the components of the constant current source 12 is actively controlled as it would be in the case of a transistor in the line which is used for current limitation. Due to the two inductances, the junction and the capacitance for each line, the network shown in FIG. 2 can be referred to as a T-network. Other passive networks could alternatively be used, for example a so-called Π-network, having two junctions and one passive element on the line between the junctions. Passive networks, such as the T-network or the Π-network can also be referred to as a six-pole filter, since there are connections to three lines on both sides.

As mentioned above, the combination of a switching unit and a constant current source shown in FIG. 2 comprises a line which connects the first contact 14 with the second contact 15. There is no inductive coupling. An alternative comprising such an inductive coupling will be described with reference to FIG. 5.

In the following, variants, embodiments and alternatives of the module 11 of FIG. 2 will be described with reference to FIG. 3-FIG. 5. Same reference numerals will be used to designate components having the same function as the components shown in FIG. 2. The term "same function" means that the dimension of the inductances and capacitances is not necessarily the same. Furthermore, the examples of FIG. 2-FIG. 5 comprise three phase lines. However, although unusual, the number of the phase lines may differ.

Figure 3:
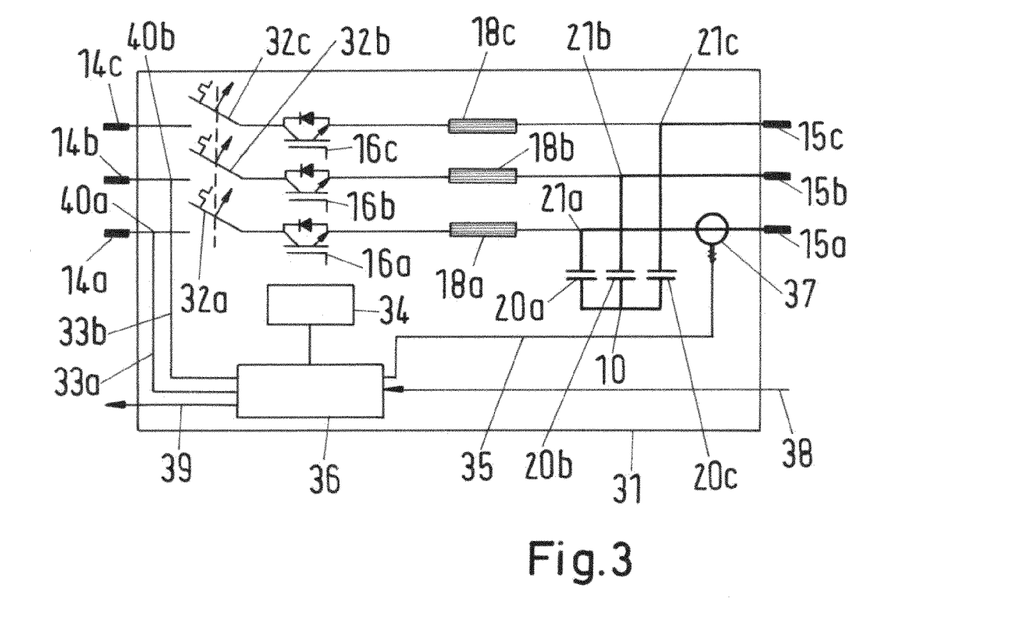

The module 31 shown in FIG. 3 additionally comprises a second switch 32a, 32b, 32c in each line between the first contact 14a, 14b, 14c and the controllable switch 16a, 16b, 16c. The second switch 32 is adapted to interrupt the line in case of an over-current. For example, an earth leakage or ground fault may be the reason for the over-current. The second switches 32 are mechanically or otherwise combined with each other so that the opening of the line performed by one of the switches 32 causes the other switches 32 also to open the respective line.

A low-lever control unit 34 is provided within the module 31 for performing the actions needed to switch the controllable switches 16a, 16b, 16c. In practice, the low-level control unit 34 may be realized by individual gate drive units of the IGBTs. The operation of the low-level control unit 34 is controlled by a higher-level control device 36. In the example shown in FIG. 3-FIG. 5, the control device 36 receives a current signal from a current sensor 37 in one of the lines, wherein the current sensor 37 is connected with the control device 36 via a signal line 35. The control device 36 is adapted to evaluate the current signal and to compare it with a comparison value which corresponds to the expected value of the constant current which is to be produced by the constant current source.

Therefore, the current sensor 37 is located at one of the lines between the constant current source and the second contact 15. Alternatively, the current sensor may be located outside of the module 31 within the line of the segment. For example, if the deviation between the expected current value and the value measured by the current sensor differs by more than a predetermined threshold value, the control device 36 controls the low-level control units 34 to open the controllable switches 16. The current value may also be transmitted back to the inverter for adjustment of the voltage in order to generate the desired current.

In addition or alternatively, the control device 36 is connected to a vehicle detection loop 38 for detecting the presence of a vehicle in the vicinity of the associated segment. The control device 36 is adapted to evaluate a corresponding vehicle detection signal received from the vehicle detection loop. Depending on the presence of a vehicle in the vicinity of the associated segment, the control device 36 controls the low-level control unit 34 to close or open the controllable switches 16 so that the associated segment is only operated while a vehicle is in the vicinity of the segment. In particular, in case of the phase lines of the segment being buried in the ground, vicinity means that the vehicle is located or travelling above the segment.

FIG. 3 also shows a further optional feature. Two of the phase lines of the module are connected with the control device 36. The junctions 40a, 40b of these connection lines 33 with the phase lines are located between the first contact 14 and the switches 16 or—if present—the second switches 32. This arrangement allows powering the control device directly from the alternate current distribution (i.e. the supply) without the necessity of an additional power distribution for the control device. The control device 36 can also measure the voltage between two of the phase lines of the alternating current supply. This information can be used for the decision whether the controllable switches 16 shall be switched on. For example, if the voltage is too small the control device 36 does not trigger the low-level control unit 34 to switch on the switches 16. One possible reason for the voltage being too small is a line failure (e.g. ground fault) of the lines of the alternating current supply. Another possibility is a failure of the inverter which produces the alternating current flowing through the alternating current supply.

It follows from the above description that some intelligence concerning correct and reliable operation of the associated segment can be integrated in a control device of the switching unit.

The control device can be integrated in a common housing and/or attached to a common rack with the switching unit. More generally speaking, the combination of the controllable switches and the control device can be pre-fabricated and can be installed afterwards on site.

Furthermore, the control device 36 may be connected to a distant central control device via a signal connection 39, for example via a digital data bus, such as a CAN-bus (controller area network bus).

Figure 4:
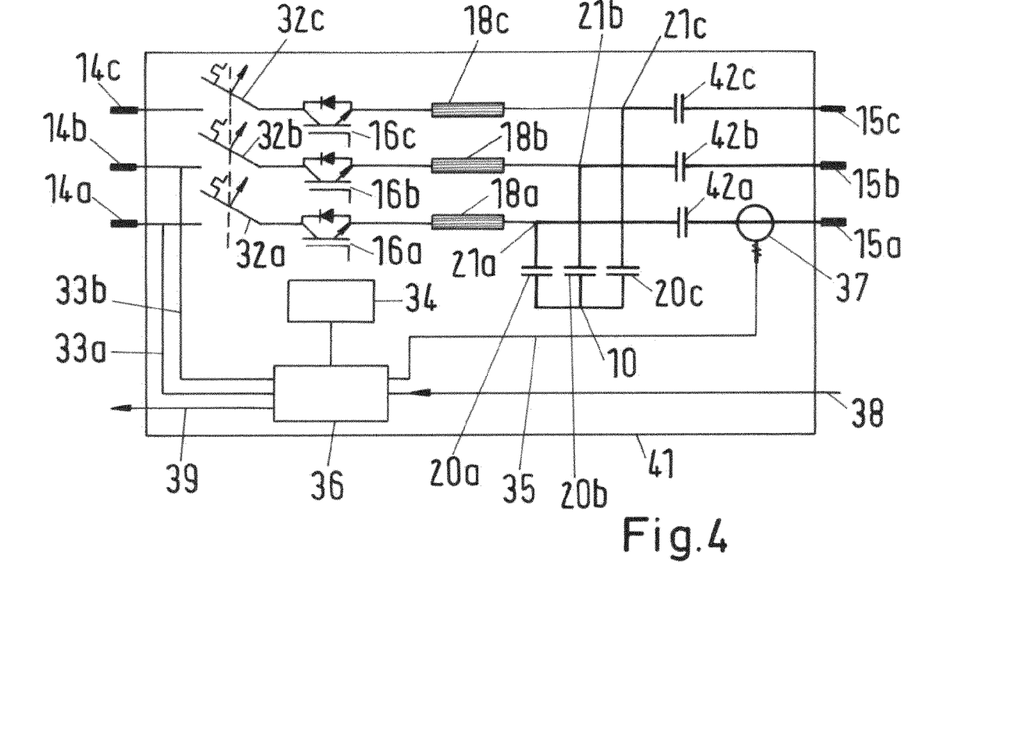

FIG. 4 shows an embodiment comprising an additional capacitance 42a, 42b, 42c. In contrast to the first capacitance 20, the second capacitance 42 is arranged between the junction 21 and the second contact 15 within the phase line. The purpose of the second capacitance 42 is to compensate the inductance of the corresponding line of the associated segment. "Compensation" in this context means tuning the segment to be resonant at the desired frequency and avoiding reactive power draw.

Figure 5:
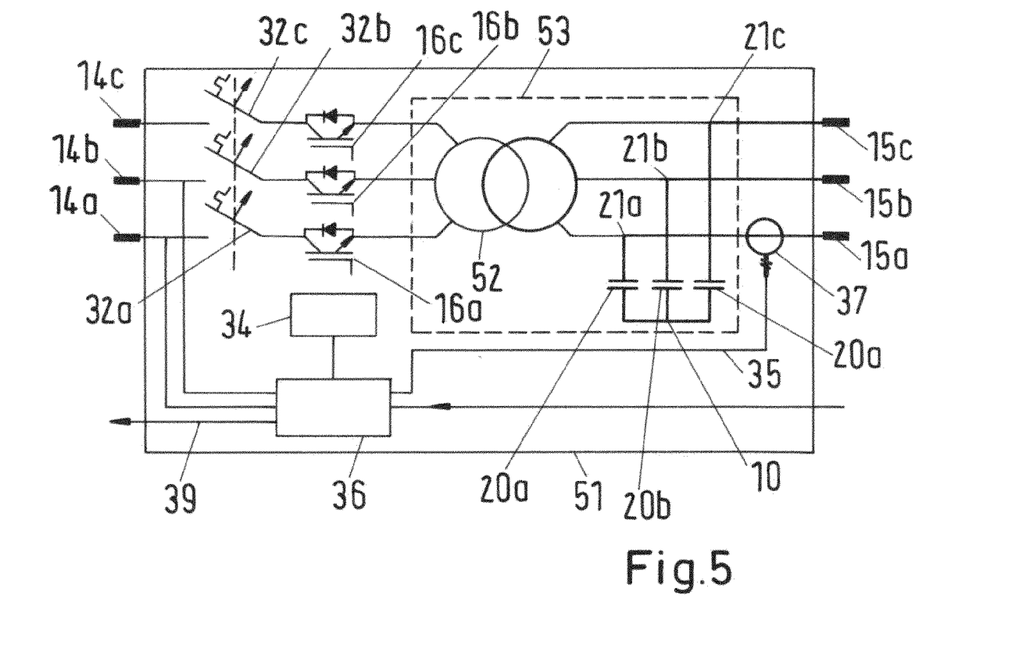

FIG. 5 shows a module 51 comprising a transformer arrangement 52 instead of the inductances 18 of FIG. 3, FIG. 4. Preferably, the transformer arrangement 52 provides a galvanic separation of the primary side and the secondary side. The primary side is the side of the controllable switches 16. Correspondingly, the secondary side is the side of the second contacts 15. The transformer arrangement 52 may be a three-phase transformer or a set of individual transformers for each line. The inductances on the secondary side of the transformer arrangement function in the same manner as the inductances 18 with respect to the production of a constant current through the segment. The module 51 may comprise a pre-fabricated unit 53 comprising the transformer arrangement 52 and the capacitances 20, including the junctions 21 and the star point 10.

Figure 6:
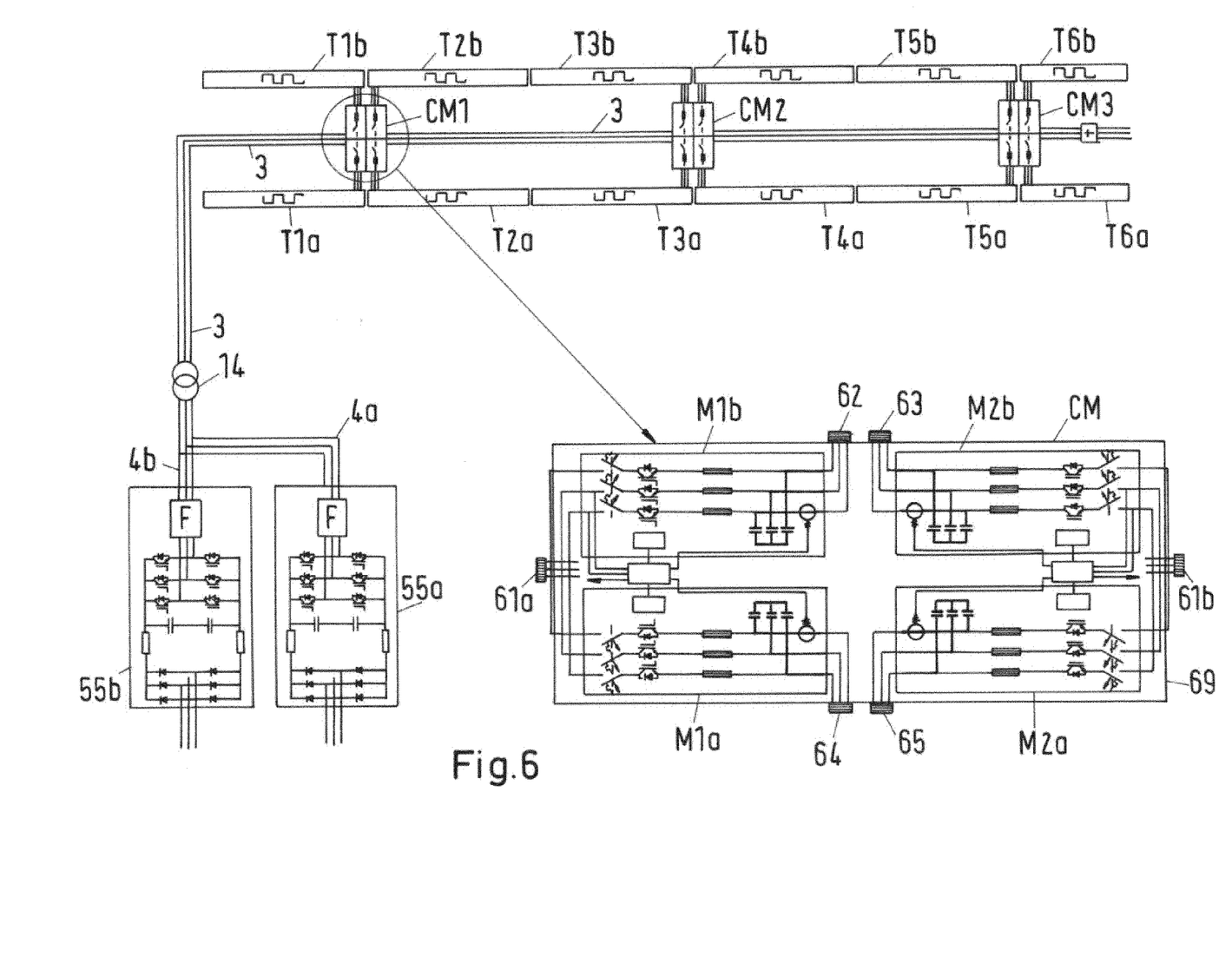

The arrangement shown in FIG. 6 comprises pre-fabricated combined modules CM, one of which is enlarged at the bottom of FIG. 6. The combined modules CM1 comprises a plurality of individual modules M1a, M2a, M1b, M2b which are associated to a corresponding individual segment T1a, T2a, T1b, T2b. The same applies to the other combined modules CM2, CM3. The pre-fabricated combined modules CM may comprise a housing 69 and/or rack which receives and/or carries the individual modules M. In addition, the combined modules CM may comprise electric connectors, such as plug-in connectors, for electrically connecting the modules M to the alternating current supply 3 and to the segments T. In the enlarged view of module CM, a first connector 61a is to be connected to the alternating current supply 3. On the right hand side of the enlarged view, a second connector 61b is shown which is also to be connected to the alternating current supply 3. Preferably, there is a three-phase connection within the combined module CM extending from the first connector 61a to the second connector 61b so that this three-phase connection forms part of the alternating current supply 3. The three-phase connection between the connectors 61a, 61b is not shown completely in the enlarged view.

The individual modules M1a, M2a, M1b, M2b are connected to the first or second connector 61a, 61b via corresponding junctions. In addition, each individual module M1a, M2a, M1b, M2b is connected to a further connector 62, 63, 64, 65 which is preferably accessible from the outside of combined module CM, for connecting the respective module M with the associated segment T.

For example, each combined module CM can be cooled by an additional cooling unit, such as a fan. Typically, one cooling device is sufficient for each combined module CM.

The combined modules CM can be arranged in between the two tracks which extend in parallel to each other and which are defined by the consecutive segments T1a, T2a, T3a, T4a, T5a, T6a; T1b, T2b, T3b, T4b, T5b, T6b. For example, the tracks may be tracks for rail vehicles or lanes for road automobiles, such as busses.

In contrast to the arrangement shown in FIG. 1, there are two parallel inverters (as part of respective AC/AC converter arrangements 55a, 55b) which produce the alternating current through the alternating current supply 3. However, in practice, the number of inverters may vary, in particular depending on the required maximum current. In the embodiment shown in FIG. 6, each inverter is connected at its alternating current side to a transformer 14 via a connection line 4a, 4b.

The individual modules M shown in FIG. 6 and FIG. 7 can, for example, be configured as described with reference to FIG. 3-FIG. 5.

Figure 7:
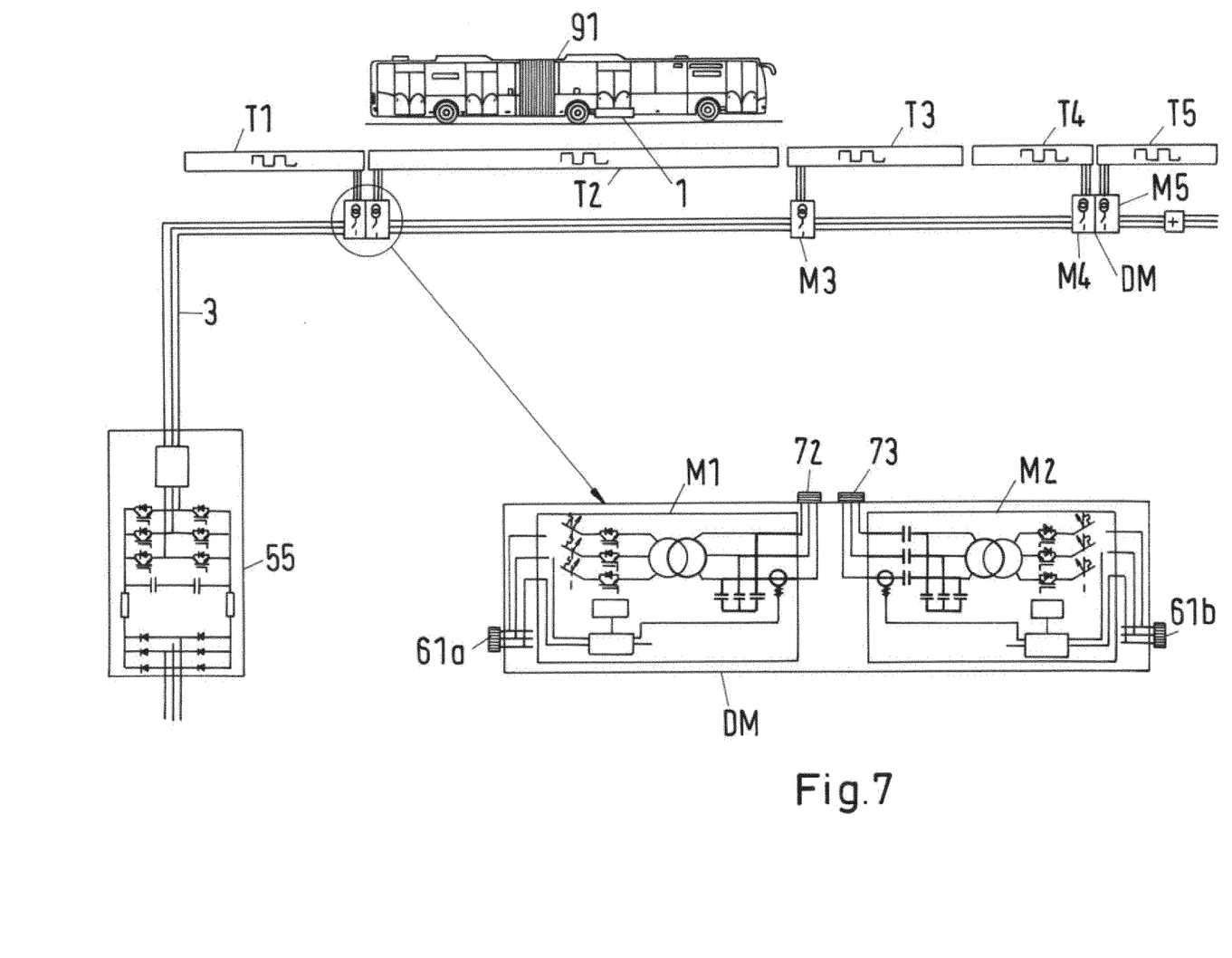

FIG. 7 schematically shows a vehicle 91, in particular a bus for public transport of people, comprising a single receiver 1 for receiving the electromagnetic field produced by segments on the primary side of the system. There are five consecutive segments T1, T2, T3, T4, T5 which differ with respect to the lengths in the direction of travel (from left to right in FIG. 7). At the boundary between segment T1 and segment T2 as well at the boundary between segment T4 and segment T5, there is a combined module DM comprising individual modules M1, M2 (or in case of the segments T4, T5 comprising individual modules M4, M5). Similarly to the combined module CM shown in FIG. 6, the contained individual modules M comprise the switching unit and constant current source associated to the respective segment T. The combined module DM shown in FIG. 7 is constructed in the same manner as described for combined module CM shown in FIG. 6 with the exception that combined module DM only contains two individual modules.

The first and second connector 61a, 61b are connected to the alternating current supply 3 and the additional external connectors 72, 73 of combined module DM are connected to segment T1 or T2, respectively. In the same manner as described above, the external connectors 61a, 62b may be connected by a three-phase line extending within combined module DM which forms a section of alternating current supply 3.

The effective alternating voltage of the alternating current supply may be, for example, in the range of 500-1.500 V. The constant current which is produced the constant current sources and which flows through the associated segment may be in the range of 150-250 A. The frequency of the alternating current may be in the range of 15-25 kHz.

Using switching units at the interface between the current supply to the respective segment has the advantage—compared to using inverters at the interface—that switching losses during operation of an inverter can be reduced: the number of inverters is reduced and one or more than one parallel inverter/s which is/are located at the input of the alternating current supply can be operated in constant-voltage mode. In addition, central inverters can be cooled in a more effective manner than a plurality of de-centralized inverters.

Another advantage is that the switches of the switching unit at the interface between the alternating current supply and the segment can be configured with respect to smaller heat losses, since these switches are operated only for starting and stopping the operation of the associated segment. In contrast, corresponding switches of inverters at the interface are operated at operating frequencies of at least some kHz. This means that the switches of the switching units need to perform and to withstand less switching operations during their life time. Therefore, costs are decreased, reliability can be increased and the construction volume of the switching unit is smaller than for inverters.

The invention claimed is:

1. A system for transferring electric energy to a vehicle, comprising:
the system comprises an electric conductor arrangement for producing an alternating electromagnetic field and for thereby transferring electromagnetic energy to the vehicle, the conductor arrangement comprises a plurality of consecutive segments, wherein each segment extends along a different section of the path of travel of the vehicle, the system comprises an alternating current supply for conducting electric energy to a plurality of the segments, wherein the segments are electrically connected in parallel to each other with the alternating current supply, each segment is coupled to the supply via an associated switching unit adapted to switch on and off the segment by connecting or disconnecting the segment to/from the supply, during operation of the segment while the switching unit is switched on, each segment is coupled to the supply via the associated switching unit and via a constant current source, the constant current source is coupled to the segment on one side and to the supply on the other side and is adapted to keep the electric current through the segment constant independently of the electric power which is transferred to one or more vehicles travelling along the segment, the alternating current supply is connected with an inverter which is conducted via the supply and through the constant current source of the segment during operation.

2. The system of claim 1, wherein the alternating current supply and the segments comprise a plurality of lines, wherein each line is adapted to carry a different phase of a multi-phase alternating current, wherein each line of the plurality of the segments is coupled to a corresponding line of the alternating current supply via a corresponding switch of the associated switching unit.

3. The system of one of claim 1, wherein the switching unit of at least one of the segments is connected with a control device adapted to automatically control the switching state of the switching unit and thereby to control the operation of the segment.

4. The system of claim 3, wherein the control device is connected with a signal receptor, wherein the signal receptor is adapted to receive a signal indicating that a vehicle is located in the section of the path of travel along which the segment extends or is about to reach the section and the signal receptor and the signal receptor is adapted to trigger the control device and the switching unit correspondingly so that the vehicle is provided with energy by the segment.

5. The system of claim 4, wherein the control device is connected with a current sensor for measuring the current through the segment or through one of the lines of the segment and wherein the control device is adapted to switch off the segment if the measured current fulfils a predetermined condition.

6. The system of claim 3, wherein the control device is connected with a current sensor for measuring the current through the segment or through one of the lines of the segment and wherein the control device is adapted to switch off the segment if the measured current fulfills a predetermined condition.

7. The system of claim 1, wherein at least for one of the segments an associated constant current source and an associated switching unit are integrated in a common module.

8. The system of claim 7, wherein the common module comprises the constant current sources and switching units associated to two segments which are consecutive segments with respect to the path of travel.

9. The system of claim 7, wherein the common module comprises the constant current sources and switching units associated to two segments which are segments of different paths of travel extending in parallel or transversely to each other.

10. The system for transferring electric energy to a vehicle as in claim 1, wherein the vehicle is a track bound vehicle or a road automobile.

11. A method of manufacturing a system for transferring electric energy to a vehicle comprising the steps of:
providing an electric conductor arrangement for producing an alternating electromagnetic field and for thereby transferring electromagnetic energy to the vehicle,
providing a plurality of consecutive segments as part of the conductor arrangement, so that each segment extends along a different section of the path of travel of the vehicle,
providing an alternating current supply for conducting electric energy to a plurality of the segments, wherein the segments are electrically connected in parallel to each other with the alternating current supply,
coupling each segment to the supply via an associated switching unit, wherein the switching unit is adapted to switch on and off the segment by connecting or disconnecting the segment from the supply,
coupling each segment to the supply via the associated switching unit and via a constant current source, wherein the constant current source is coupled to the segment on one side and to the supply on the other side and is adapted to keep the electric current through the segment constant—while the segment is switched on—independently of the electric power which is transferred to one or more vehicles travelling along the segment,
the alternating current supply is connected with an inverter for inverting a direct current into an alternating current which is conducted via the supply and through the constant current source to the segment during operation.

12. A method of operating a system for transferring electric energy to a vehicle comprising the steps of:
producing an alternating electromagnetic field and thereby transferring electromagnetic energy to the vehicle by using an electric conductor arrangement,
using a plurality of consecutive segments as part of the conductor arrangement, wherein each segment extends along a different section of the path of travel of the vehicle,
conducting electric energy to a plurality of the segments by using an alternating current supply, wherein the segments are electrically connected in parallel to each other with the alternating current supply,
using for each segment an associated switching unit in order to switch on and off the segment by connecting or disconnecting the segment to/from the supply,
keeping the electric current through the segment constant—while the segment is switched on—independently of the electric power which is transferred to one or more vehicles travelling along the segment, wherein a constant current source, which is coupled to the segment on one side and to the supply on the other side is used to keep the current constant,
during operation of a segment the alternating current supply is provided with an alternating current by an inverter which inverts a direct current into the alternating current and the alternating current is conducted via the supply and through the constant current source to the segment.

\* \* \* \* \*

UNITED STATES PATENT AND TRADEMARK OFFICE
CERTIFICATE OF CORRECTION

PATENT NO. : 9,634,523 B2
APPLICATION NO. : 14/124284
DATED : April 25, 2017
INVENTOR(S) : Kurt Vollenwyder It is certified that error appears in the above-identified patent and that said Letters Patent is hereby corrected as shown below:

In the Claims

Column 13, Line 35, Claim 3, delete "of one of" and insert -- of --

Column 14, Line 10, Claim 11, delete "vehicle" and insert -- vehicle, --

Column 14, Line 15, Claim 11, delete "arrangement," and insert -- arrangement --

Signed and Sealed this
Twentieth Day of June, 2017

Joseph Matal
*Performing the Functions and Duties of the*
*Under Secretary of Commerce for Intellectual Property and*
*Director of the United States Patent and Trademark Office*